(12) United States Patent
Summerer

(10) Patent No.: US 9,173,102 B2
(45) Date of Patent: Oct. 27, 2015

(54) METHOD FOR UPDATING A DATA CARRIER

(75) Inventor: Alexander Summerer, Poing (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 189 days.

(21) Appl. No.: 14/008,420

(22) PCT Filed: Mar. 29, 2012

(86) PCT No.: PCT/EP2012/001397
§ 371 (c)(1),
(2), (4) Date: Sep. 27, 2013

(87) PCT Pub. No.: WO2012/130460
PCT Pub. Date: Oct. 4, 2012

(65) Prior Publication Data
US 2014/0018041 A1 Jan. 16, 2014

(30) Foreign Application Priority Data
Mar. 31, 2011 (DE) .......................... 10 2011 015 710

(51) Int. Cl.
*H04M 3/16* (2006.01)
*G06F 7/04* (2006.01)
*H04W 12/08* (2009.01)
(Continued)

(52) U.S. Cl.
CPC ................. *H04W 12/08* (2013.01); *G06F 8/61* (2013.01); *G06F 9/44505* (2013.01); *G06F 21/51* (2013.01); *G06F 2221/2141* (2013.01)

(58) Field of Classification Search
CPC ....... G06F 9/44589; G06F 21/34; G06F 8/61; G06F 9/44505; H04W 12/08
USPC .................. 713/176; 726/9, 22; 455/410, 411
See application file for complete search history.

(56) References Cited

U.S. PATENT DOCUMENTS

| 2003/0216927 | A1* | 11/2003 | Sridhar et al. ..................... 705/1 |
| 2005/0184163 | A1* | 8/2005 | de Jong .......................... 235/492 |
| 2007/0168453 | A1* | 7/2007 | Ito et al. ......................... 709/213 |
| 2013/0145429 | A1* | 6/2013 | Mendel et al. ..................... 726/4 |
| 2014/0025940 | A1* | 1/2014 | Giraud et al. ..................... 713/2 |

FOREIGN PATENT DOCUMENTS

EP 1361527 A1 11/2003

OTHER PUBLICATIONS

International Search Report cited in PCT application No. PCT/EP2012/001397, mailed on Jun. 14, 2012.
(Continued)

*Primary Examiner* — William Nealon
(74) *Attorney, Agent, or Firm* — Workman Nydegger

(57) ABSTRACT

The invention provides a method for updating a data carrier inserted in a telecommunication end device with regard to a data-carrier application executable in the data carrier, comprising the steps of: making updating data available to a security application installed in the data carrier; updating the data carrier according to the updating data, the updating of the data carrier comprising the steps of: transferring at least a part of the updating data from the security application to a programming interface installed in the telecommunication end device and adapted for communication between the telecommunication end device and the data carrier; onward transferring the transferred updating data from the programming interface to a data-carrier management of the data carrier installed in the data carrier; updating the data carrier according to the onward transferred updating data.

10 Claims, 5 Drawing Sheets

Figure 4A:
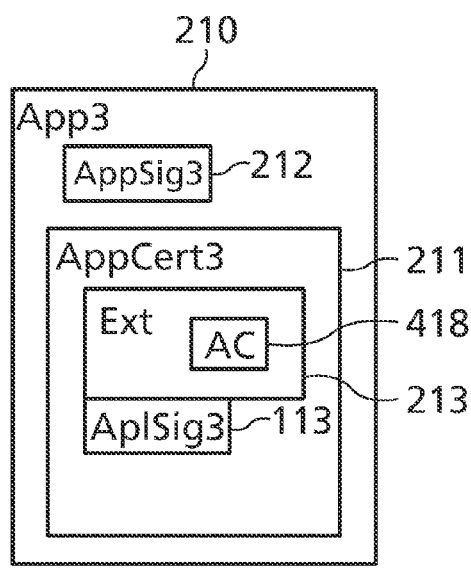

(51) Int. Cl.
*G06F 9/445* (2006.01)
*G06F 21/51* (2013.01)

(56) References Cited

OTHER PUBLICATIONS

William G. Sirett et al.: "Design, Installation and Execution of a Security Agent for Mobile Stations", Jan. 1, 2006, Smart Card Research and Advanced Applications Lecture Notes in Computer Science; LNCS, Springer Berlin, DE, pp. 1-15.

ITU-T—Telecommunication Standardization Sector of ITU, X.509, Nov. 2008, "Series X: Data Networks, Open System Communications and Security; Information Technology—Open Systems Interconnection—The Directory; Public-key and Attribute Certificate Frameworks", pp. i-vii & 1-173.

\* cited by examiner

FIG 1

| ( | S1 | AplProv | install Apl4 | ) |
|---|---|---|---|---|
| | S2 | AplProv | write UpdtDat | |
| | S3 | AplProv | sign AppCert3 | |
| | S4 | AplProv | deploy App3 | |
| | S5 | | install App3 | |
| | S6 | | start App3 | |
| | S7 | App3 | access Apl4 | |
| | S8 | API/SecApl | verify AppCert3 | |
| | S9 | API | transmit UpdtDat to SecApl | |
| | S10 | SecApl | update CL | |
| | S11 | SecApl | grant access | |

| S10a | SecApl | update CL, AC |
| S10b | SecApl | decode Apl4 from UpdtDat |
| S10c | SecApl | transmit Apl4 to API |
| S10d | API | transmit Apl4 to SDCMngr |
| S10e | SDCMngr | install Apl4 |

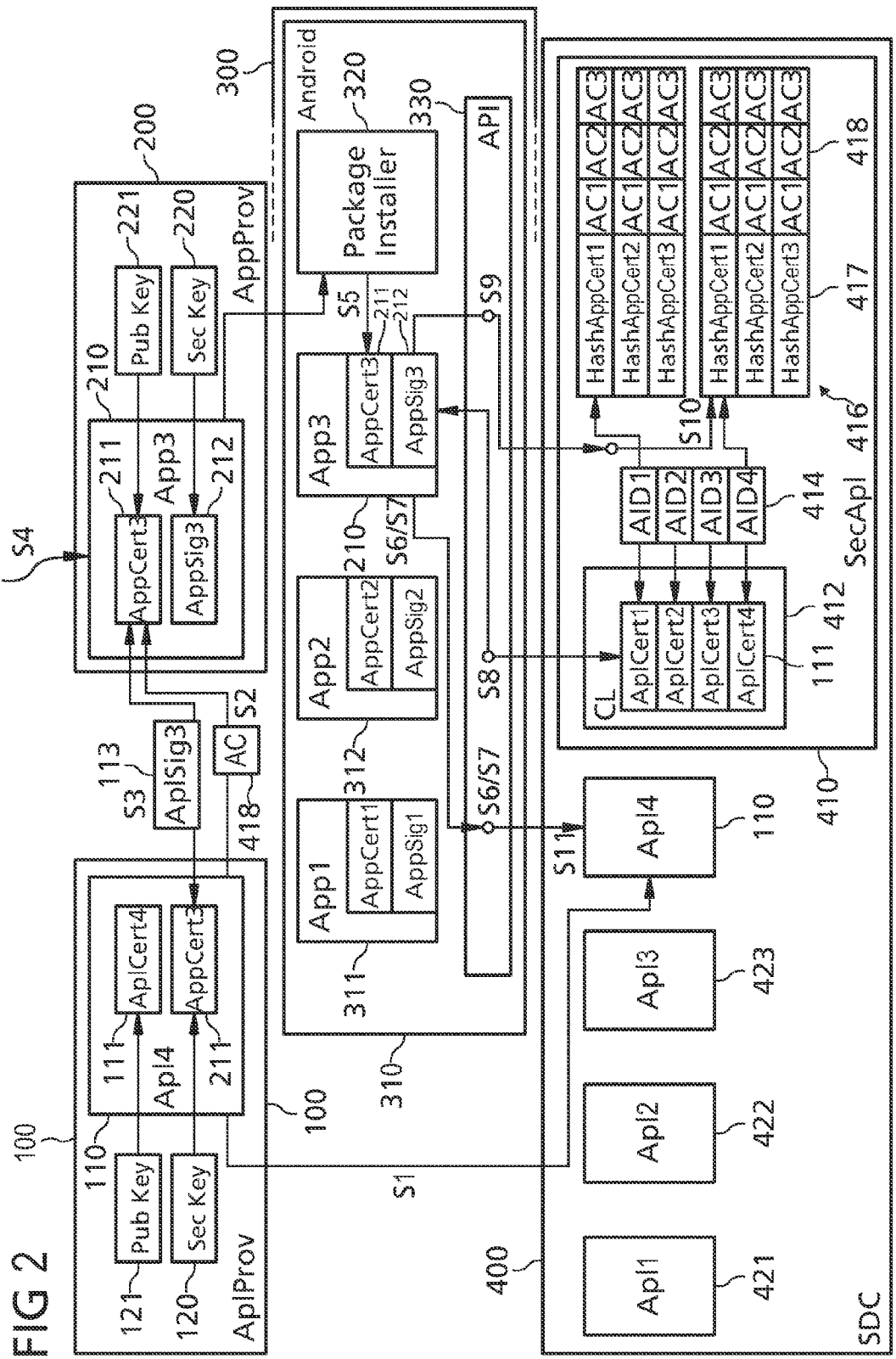

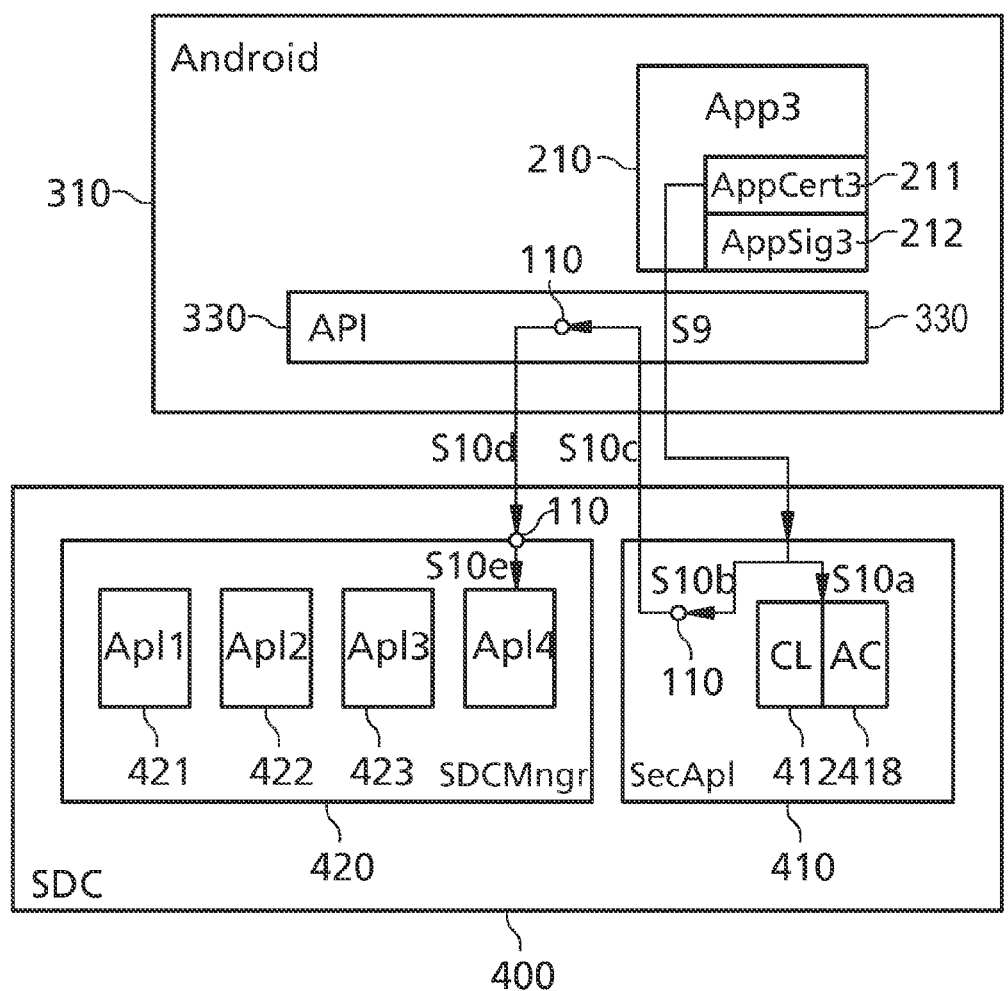

FIG 5

X509 Certificate

Version: 3
   SerialNumber: 1287080631032
      IssuerDN: CN=issuername,OU=issuerunit,O=GuD,L=Munich,ST=BY,C=GER
      Start Date: Thu Oct 14 18:23:51 CEST 2010
      Final Date: Wed Oct 14 18:23:51 CEST 2015
      SubjectDN: CN=ownername,OU=ownerunit,O=GuD,L=Munich,ST=BY,C=GER
      Public Key: RSA Public Key
       modulus:
b65f5eacf75716023af5ae0f273b5d26ee9a2975cb95ae8b9ed016029780abde37713187dcf30a64fefab2113c72776
f9ef663c1ba0b30d5a2ea1b72a154bfe90b7c9edc25aef3464cd66c25f8ffac31c284f3beee60da331bdb37169fa226a
34dd35ba5398152c2c95030ec35f6d52d7385557b61c9ce0e6cfecd2d81ed2e1b
      public exponent: 10001

Signature Algorithm: SHA1withRSA
      Signature: 69c82895bd3e7b0fa188f9be8e89c56deb1e9607
          16d8ce2a472d2ff7c8c8d61ae4b00817d6b02cfc
          cf100d2a29f6a2a0588881d04b4e062446b10333
          c07bc416766d2cfc287b38ae8c75f297ba704637
          dd6bc0cc162c6d16f8c3e9958cd9980ec72f1c98
          22b331a5f722576c85895d149f7304d271947c4b
          74e81e8ec8422028
Extensions:
    Extension Applet (OID: 2.5.4.6)
      critical(false)
      Value:
       appletAid: A0 00 00 00 03 00 00 00
       encSecureChannelKeySet: 11 23 15 21 57 13 98 24 53 57 10 24 62 14 41 52
       appletData:
        PackageLoadParameters:
        DAPBlockParameter: <SD_AID>, <enc_DAP_KeySet>
        DAPBlockParameter: <SD_AID>, <enc_DAP_KeySet>
        DAPBlockParameter: <SD_AID>, <enc_DAP_KeySet>
        CapFile: <JavaCard CAP File>
        CapFileLoadOptions: Descriptor, Debug
        SecurityDomainAid: A0 00 00 00 03 00 02 20
        DelegatedManagementSecurityDomainAid: A0 00 00 00 03 00 02 20
        EncLoadTokenKeySet: 11 23 15 21 57 13 98 24 53 57 10 24 62 14 41 52
       AppletInstallParameters:
        PackageAid: A0 00 00 00 03 00 00 00
        AppletClassAid: A0 00 00 00 03 00 00 00
        AppletInstanceAid: A0 00 00 00 03 00 00 00
        DelegatedManagementSecurityDomainAid: A0 00 00 00 03 00 02 20
        encInstallTokenKeySet: 11 23 15 21 57 13 98 24 53 57 10 24 62 14 41 52
    Extension APCertificate (OID: 2.5.4.7)
      critical(false)
      Value:
       Aid: A0 00 00 00 03 00 00 00
       APCertificate: <DER Coded X.509 Certificate>
    Extension ACLEntries (OID: 2.5.4.8)
      critical(false)
      Value:
       Aid: A0 00 00 00 03 00 00 00
        ACLEntry:
         ApkHash: 14 36 36 58 29 74 12 10 53 58 14 36 36 58 29 74 12 10 53 58
         Acl: 00 A4 04 00 00 FF FF FF FF 00 E4 00 00 00 FF FF FF FF
        ACLEntry:
         ApkHash: 12 49 12 53 34 47 34 24 57 13 12 49 12 53 34 47 34 24 57 13
         Acl: 00 E4 00 00 00 FF FF FF FF

METHOD FOR UPDATING A DATA CARRIER

This invention relates to a method for updating a data carrier with regard to a data-carrier application executable in the data carrier, with the data carrier being inserted in a telecommunication end device, to an accordingly adapted data carrier and to an accordingly adapted telecommunication end device.

Nowadays, telecommunication end devices equipped with powerful processors and many kinds of applications—so-called smartphones—have become very popular. The telecommunication connection or mobile radio connection required therefore, and/or the secure memory space required for the diverse uses that frequently also process confidential data, is made available by secure data carriers which are insertable into the respective telecommunication end device, e.g. by (U)SIM mobile radio cards, smart cards, Secure Digital (SD) memory cards or the like. Such secure data carriers normally also comprise a processor and applications executable thereon. Two different kinds of applications can be distinguished here, namely, the end-device applications installed on the telecommunication end device—also referred to as "apps" with some smartphones—and the data-carrier applications executable on the data carrier—also referred to as "applets" with some data carriers.

While diverse uses are made available on the telecommunication end device with the end-device applications (e.g. apps), the data-carrier applications (e.g. applets) frequently relate to uses in connection with security aspects of the telecommunication end device, e.g. the telecommunication connection or mobile radio connection, the identity of a user, monetary transactions or other data that are confidential or worthy of protection. The data carriers thus have special security functionalities, in particular a secure memory.

End-device applications executed on the telecommunication end device frequently require access to data-carrier applications in the secure data carrier. To prevent abuse of the security-relevant functionalities of the data-carrier applications and of the confidential data stored there, one can provide e.g. an access rights management which allows an end-device application to access a data-carrier application only if it has corresponding access rights. However, such a mechanism relates only to the access rights of those end-device applications that were already known and could be taken into consideration upon the manufacture of the data carrier, e.g. upon its initialization or personalization. End-device applications that are later installed on a telecommunication end device are therefore not known to the access rights management and accordingly have no access to installed data-carrier applications. It is even more of a problem to access those data-carrier applications that have yet to be installed on the data carrier. Updating access rights later or actually installing new data-carrier applications later on an already delivered data carrier is undesirable, if not impossible, in this connection in particular for security reasons.

Because telecommunication end devices usually have only one data-carrier slot, it is also impossible to make changed access rights or new data-carrier applications available on a second secure data carrier. One might consider making available a replacement data carrier accordingly updated by the provider, but this is not especially advantageous because it would lose important user data that are impossible or difficult to procure again, e.g. digital certificates, licenses or rights.

In this connection, EP 1 361 527 A1 proposes updating the data stock of a delivered mobile radio card by means of a contactless data communication via an air or OTA (over-the-air) interface. However, other data carriers insertable into telecommunication end devices, e.g. SD cards or the like, frequently do not make available the technical infrastructure this requires. Furthermore, users of a secure data carrier with confidential user data would be shaken in their trust in the data security, because contactless data transfers frequently, and with reason, trigger fears about data security and data abuse.

To enable an external device, e.g. a telecommunication device, to have programming access to a data carrier, it is customary to install in the device a programming interface of the data carrier, in which there are declared e.g. the data carrier's requirements in terms of data formats and the like which must be taken into consideration when programming data into the data carrier. Such a programming interface can be implemented for example as an operating-system enhancement or operating-system extension of an operating system installed in the device for controlling the device. By means of the programming interface of the data carrier the device is able to program data into the data carrier without itself having to know details about data formats required for the data carrier. Such a programming interface is frequently referred to as an Application Programming Interface (API).

In an unpublished in-house prior art from the applicant, which is described in a patent application submitted on the same day as the present patent application, there is stated a method for updating a data carrier, which is inserted into a telecommunication end device, with regard to end-device applications ("apps") to be newly installed in the telecommunication end device. For updating the data carrier there are employed configuration data with which access rights of the new end-device application ("app") to data-carrier applications ("applets") installed in the data carrier are updated. Optionally, upon the updating of the data carrier there is moreover loaded into the data carrier a new data-carrier application ("applet") whose functionalities are required by the new end-device application. An updating of access rights by means of configuration data is frequently likewise required here. In this method the configuration data, and optionally the data-carrier application, are first loaded into the telecommunication end device together with the end-device application to be newly installed. The end-device application is installed in the telecommunication end device. The configuration data are passed on to a security application installed in the data carrier. The security application is updated with the configuration data.

A data-carrier application available upon the security application cannot be installed in the data carrier directly through the security application. For the security application is adapted for managing access rights between end-device applications and data-carrier applications and can receive configuration data and use the configuration data to update access rights implemented within the security application. However, the security application is not adapted and not able to carry out an installation of data-carrier applications outside the security application without further measures. An installation of data-carrier applications can be carried out exclusively through a data-carrier management of the data carrier. A direct communication between the security application and the data-carrier management is not possible.

Allowing a direct loading of data-carrier applications into the data carrier while circumventing the security application, e.g. directly by means of the data-carrier management, is disadvantageous because this would involve the danger of software from an unknown source passing into the data carrier unchecked. Harmful software could thereby also pass into the data carrier.

The invention is based on the object of providing a secure and versatile method for updating a data carrier with regard to a data-carrier application executable in the data carrier, in particular a method making it possible to install updating data to be installed outside a security application of the data carrier, such as for example data-carrier applications, in the data carrier in a secure manner.

This object is achieved by a method according to claim 1. Advantageous embodiments of the invention are stated in the dependent claims.

The method according to claim 1 is adapted for updating a data carrier with regard to a data-carrier application executable on the data carrier, with the data carrier being inserted in a telecommunication end device.

The method comprises the steps of:
making updating data available to a security application installed in the data carrier;
updating the data carrier according to the updating data, the updating of the data carrier comprising the steps of:
transferring at least a part of the updating data from the security application to a programming interface of the data carrier, said interface being installed in the telecommunication end device and adapted for communication between the telecommunication end device and the data carrier;
onward transferring the previously transferred updating data from the programming interface to a data-carrier management of the data carrier installed in the data carrier; and
updating the data carrier according to the onward transferred updating data.

Updating data to be loaded into the data carrier are always loaded into the data carrier in a secure manner with involvement of the security application and are thus subject to the control mechanisms of the security application. For at least a part of the updating data, the possibility is made available to transmit the updating data from the security application to the programming interface and from there to the data-carrier management. The programming interface is thus employed as a proxy server between the security application and the data-carrier management, and as such enables a communication between the two entities, security application and data-carrier management, which are provided spatially within the data carrier but mutually separated in terms of communication technology. As a result, updating data that are to be installed outside the security application can also be taken into consideration in a secure manner.

Hence, there is provided according to claim 1 a secure and versatile method for updating a data carrier with regard to a data-carrier application executable in the data carrier.

In particular updating data that are to be installed outside the security application, such as e.g. data-carrier applications to be newly added to the data carrier, can be brought into the data carrier and installed there securely via the programming interface utilized as a proxy server by the method according to the invention.

The updating data are preferably made available to the data carrier through the telecommunication end device, in particular through the programming interface. The programming interface is installed in the telecommunication end device, is associated with the data carrier and is adapted for communication between the telecommunication end device and the data carrier, such as for example a smart card API (Application Programming Interface).

Electively, the updating data comprise the data-carrier application, in which case the transferring comprises a transferring of the data-carrier application, the onward transferring comprises an onward transferring of the data-carrier application, and the updating of the data carrier comprises an installing of the data-carrier application in the data carrier, carried out e.g. through the data-carrier management.

The updating data electively comprise configuration data, in which case the updating of the data carrier comprises a configuring of the data carrier, in particular of the security application, by means of the configuration data. The configuration data can be installed directly in the security application, without the indirect route via the programming interface utilized as a proxy server, because their installation is effected within the security application.

The configuration data can comprise in particular updating data for the security application. Electively, the security application comprises a certificate list and at least one access rights list. The certificate list comprises data-carrier application certificates of data-carrier applications installed in the data carrier. The at least one access rights list states access rights of end-device applications installed in the telecommunication end device to data-carrier applications installed in the data carrier. Upon the configuring of the data carrier the certificate list and the at least one access rights list are updated according to the updating data, more precisely according to the configuration data.

The configuration data electively comprise a data-carrier application certificate which contains a public key of a provider of the data-carrier application. The configuring of the data carrier, in particular of the security application, comprises in this case an entering, through the security application, of the data-carrier application certificate in the certificate list. With the public key of the provider of the data-carrier application it is possible to verify signatures created by the provider of the data-carrier application with the matching secret key. It can thereby be verified that a data-carrier application to be loaded into the data carrier is actually created, or at least authorized, by the provider of the data-carrier application.

Electively, a signature, linked in particular with the updating data, is verified through the programming interface or through the security application before the data carrier is updated according to the updating data.

The signature is electively created by means of a secret key of a provider of the data-carrier application, or has been thus created. The signature is then electively verified with the above-mentioned public key, which has been brought into the data carrier e.g. with the data-carrier application certificate as mentioned above.

Electively, the making available of updating data comprises the steps of:
integrating the updating data into an end-device application certificate of an end-device application to be installed in the end device;
loading the end-device application certificate and the end-device application into the telecommunication end device;
installing the end-device application in the telecommunication end device;
extracting the updating data from the end-device application certificate; and
making the extracted updating data available, in particular through the programming interface, to the security application.

A data carrier according to the invention is insertable or inserted into a telecommunication end device and comprises data-carrier applications installed in the data carrier. According to the invention, the data carrier moreover comprises a security application installed in the data carrier, which is adapted to receive and transfer updating data and update the data carrier with the updating data according to a method according to the invention. In particular, the security application—and a data-carrier management of the data carrier—are thus able to exchange data with a programming interface belonging to the data carrier and installed in the telecommunication end device, said interface being utilized according to claim 1, i.e. utilized as a proxy server.

The data carrier is for example a (U)SIM mobile radio card or a secure digital memory card or secure multimedia card, e.g. SD or μSD card, i.e. in particular a data carrier insertable into the telecommunication end device and removable from the telecommunication end device. Alternatively, the data carrier is a data carrier adapted for firm implementation into a telecommunication end device, e.g. an Embedded Secure Element or Embedded Smart Card Chip for firm implementation into a telecommunication end device, and is inserted and firmly implemented into a telecommunication end device e.g. by the end-device manufacturer, so that it is not (or at least not without destruction) removable from the end device by a user, in particular a NFC chip for a NFC-capable telecommunication end device. An operating system of the data carrier is electively a Java-based and/or Global-Platform-compliant operating system and/or the data-carrier applications and the security application are electively Java applets.

A telecommunication end device according to the invention has an interface, e.g. a card slot, so that a data carrier is insertable in the telecommunication end device. Alternatively, a data carrier, e.g. an Embedded Secure Element or Embedded Smart Card Chip for firm implementation into a telecommunication end device, in particular also an NFC chip, is firmly inserted, i.e. implemented, into the telecommunication end device. The telecommunication end device has end-device applications installed therein. According to the invention, the telecommunication end device moreover has installed therein a programming interface of the data carrier, said interface being adapted to receive and onward transfer updating data according to a method according to the invention and optionally make them available according to claim 8. The programming interface is thus adapted to act as a proxy server vis-à-vis the data carrier, in particular to act as a proxy server between a security application of the data carrier and a data-carrier management of the data carrier. Electively, the telecommunication end device is a smartphone with an Android operating system and, as applications, so-called Android "apps" that are run-capable thereon. The invention is likewise suitable for other operating systems, however.

Hereinafter the invention will be explained more closely on the basis of exemplary embodiments and with reference to the drawing, in which there are shown:

FIG. 1 a schematic overview of the process flow upon updating a data carrier;

FIG. 2 a schematic overall view of the devices employed in a method according to FIG. 1, upon loading configuration data;

FIG. 3 a schematic detailed overview of the devices employed in an embodiment of the invention according to FIG. 1, upon loading a data-carrier application with the method according to the invention;

FIG. 4 exemplary updating data, integrated into an end-device application certificate, according to a development of the invention;

FIG. 5 an exemplary end-device application certificate for the development from FIG. 4.

FIG. 1 shows a schematic overview of the process flow upon updating a data carrier 400. The method steps S1 to S11 describe an updating of the data carrier 400 through an installation of configuration data 111, 418 for a data-carrier application 110 already installed in step S1 (possibly even much earlier), as can be effected without the invention or in addition to the invention. The step sequence S2 to S9, S10a to S10e, S11 corresponds to an embodiment of the invention, with an installation in step S10e of a data-carrier application 110 newly added to the data carrier 400, while employing an API 330, provided in a smartphone 300, as a proxy server (step sequence 10a-10e, in particular 10c-10e, instead of step 10) between parts of an SD card 400 which are per se unable to communicate directly with each other.

Hereinafter the updating of the SD card 400 according to the method steps S1 to S11 will be explained in connection with FIGS. 2 and 4a. The inventive processing and installation of a data-carrier application 110 newly added to the data carrier 400, according to the step sequence S2 to S9, S10a to S10e, S11, with the API 330 as a proxy according to step sequence 10c-10e, will be explained in connection with FIGS. 3 and 4b.

The data carrier 400 is a Secure Element for operation in a telecommunication end device in the form of a modern smartphone 300 on which the minicomputer operating system "Android" 310 from the company Google is installed, e.g. a (U)SIM card or a Secure MicroSD card employed as a (U)SIM card for such an end device. The invention is of course also expediently applicable to other computer formats with other operating systems, and implementable thereon, e.g. to personal digital assistants (PDAs), laptops, notebooks, tablet PCs and other portable minicomputers which frequently also provide telecommunication functionalities or mobile radio functionalities.

The end-device applications that are run-capable on the Android smartphone 300 are so-called "apps" 210, 311, 312 (App3, App1, App2), i.e. applications specifically adapted to the resources, areas of use and uses of smartphones 300, which apps can e.g. be downloaded from the Android Marketplace and installed on the smartphone 300. Besides the Android operating system 310 with the Android apps 210, 311, 312 running thereunder, there also exist further smartphone operating systems with specialized smartphone applications on which the present invention can also be implemented. However, Android is well suited for the following exemplary explanation of the invention on account of its open-source concept.

Involved in the method is, besides the smartphone 300, a secure digital data carrier in the form of an SD card 400 (SDC) which, inserted into a specially provided slot of the smartphone 300, represents a secure memory or a secure memory extension of the smartphone 300. The SD card 400 preferably comprises a Java-based operating system, e.g. Java Card or the like, so that the data-carrier applications 110, 421, 422, 423 (Apl4, Apl1, Apl2, Apl3) installed on the SD card 400 are applets or Java applets. Other kinds of data carrier with a processor and further computing resources that are insertable in a smartphone 300 are of course also suitable as secure data carriers 400 according to the present invention, for example (U)SIM mobile radio cards, microSD cards, secure multimedia cards and the like. Also, these data carriers can be equipped with arbitrary smart-card or memory-card operating systems and applications that are run-capable thereon.

A special applet installed on the SD card 400 is the so-called security applet 410 (SecApl), which performs security and control functions in connection with the access of an app 210 to an applet 110 and with the updating of an applet 110.

The security applet 410 manages a security structure, comprising a certificate list 412 (CL) in which different data-carrier application certificates in the form of applet certificates 111 (AplCert1 to AplCert4) are deposited. Further, the security applet 410 also manages one or several access rights lists 416, which are associated with the certificates 111 of the certificate list 412 via an applet identification 414 (AID1 to AID4). The access rights lists 416 in turn specifies app identifications 417 (HashAppCert1 to HashAppCert3) which respectively address a list 416 of access rights 418 (AC1, AC2, AC3, "access condition"), which state the access rights 418 of the app 210 designated by the app ID 417 to that applet 110 whose applet ID 414 points to the relevant access rights list 416.

If an app 210 must access an applet 110, the security applet 410 can check via the respective applet ID 414 whether the relevant app 210 possesses the necessary access rights 418. The access rights 418 associated with the app 210 via the access rights list 416 are identified through the app ID 417, which corresponds to a hash value of the app certificate 211 which value is formed anew upon each check of the access rights 418.

In case an app 210 requires an access to an applet 110 whose access rights 418 do not allow it or that is not yet installed as an applet 110 on the SD card 400, a corresponding updating of the applet 110 can be effected (i.e. a configuration of the applet 110 through an updating of the access rights 418 between the applet 110 and other applets and/or the installation of the applet 110), by the updating data required therefore being brought into an end-device application certificate in the form of an app certificate 211 (AppCert3) according to the method of FIG. 1 and being passed on to the security applet 410 on the SD card 400 in a manner transparent to the Android operating system 310, so that a configuration of the applet 110 that corresponds to the updating data can be effected there.

Hereinafter the step sequence S1-S11 will be considered in connection with FIG. 2, FIG. 4a. The employment of the API 330 as a proxy server according to the invention is not required here. For an app 210 (App3) newly loaded into the end device and requiring access to an applet Apl4 110 already present in the data carrier 400, the updating of the access rights 418 between the newly loaded app 210 (App3) and the applet Apl4 110 is performed as follows.

In a step S1 ("install Apl4") the applet Apl4 110 is or was installed on the SD card 400 by the applet provider 100 (AplProv) or at least at his instigation, for example within the framework of a manufacturing process of the SD card 400, e.g. upon its initialization or personalization. In so doing, the access rights 418 of different apps 311, 312 (App1, App2) to said applet 110 (Apl4), which rights are known at this time, are also deposited in the security applet 410 of the SD card 400.

The steps S2 to S11 relate to the installation of the app 210 (App3) to be newly installed, in the end device 300, and to the updating of the access rights 418 of the app 210 (App3) to the already installed applet 110 (Apl4). For this purpose there is installed in the smartphone 300, as an enhancement or extension of the Android operating system 310, a programming interface 330 (API) for standardized access to the SD card 400. The API 330 cooperates with the security applet 410 to implement a secure procedure for later updating the applet 110. In the case of already installed applets 421, 422, 423 (Apl1, Apl2, Apl3), the API 330 can check in cooperation with the security applet 410 the access rights 418 of an app 311, 312 accessing an applet 421, 422, 423.

The starting point of the access-right updating is the app certificate 211, which, besides the app 210 itself, is part of the installation package of the app 210 to be newly installed, and is issued by a trustworthy authority for the public key 221 of the app provider 200 (AppProv) of the app 210. Besides the app certificate 211 there also exists in the installation package of the app 210 the signature 212 (AppSig3) of the app 210, with which the app provider 200 guarantees the authenticity of the app 210 with the help of his secret key 220.

In the step S2 ("write UpdtDat") the applet provider 100 integrates the updating data, which have the form of access rights 418 here, i.e. are configuration data, into the app certificate 211 to provide the security applet 410 in this way with the access rights 418 made available by the applet provider 100 and required by the app 210, for accordingly configuring the data carrier with regard to the applet 110.

In the step S3 ("sign AppCert3") the provider 100 of the applet 110 to be updated issues with the help of his secret key 120 a signature 113 (AplSig3) of the app certificate 211 supplemented by the updating data, which signature is connected with the app 210, e.g. by the signature 113 being brought into an installation package of the app 210.

FIG. 4a shows, in case only configuration data are to be newly installed in the SD card 400 but the appurtenant applet is already present in the SD card 400, the essential contents of such an installation package of the app App3 210, comprising the signature 212 of the app provider 200, the app certificate 211 and the signature 113 of the applet provider 100. The present exemplary embodiment involves an app certificate 211 according to the X.509 certificate format, so that the updating data in the form of access rights 418 can be entered into the extension fields 213 (Ext) specified according to the X.509 standard. Said extension fields specified according to the X.509 standard can take up further data that do not have to be connected with the actual function of the certificate 211, namely, the trustworthy making available of a public key 221. An example of an app certificate 211 according to the X.509 standard with extension data ("Extensions") integrated therein is shown in FIG. 5.

The mechanism of the extension fields 213 is utilized to bring the updating data into the app certificate 211 such that they are transparent to the smartphone 300 and its functions and software components, possibly with the exception of the API 330, which is a programming interface of the SD card 400. The app certificate 211 thus represents a container data format, which can transport data in the extension fields 213 from outside the smartphone 300, e.g. from the applet provider 100, transparently through the smartphone 300 into the SD card 400 or its security applet 410. The updating data deposited in the extension fields 213 of the app certificate 211 are therefore left out of consideration by the smartphone 300.

Figure 4B:
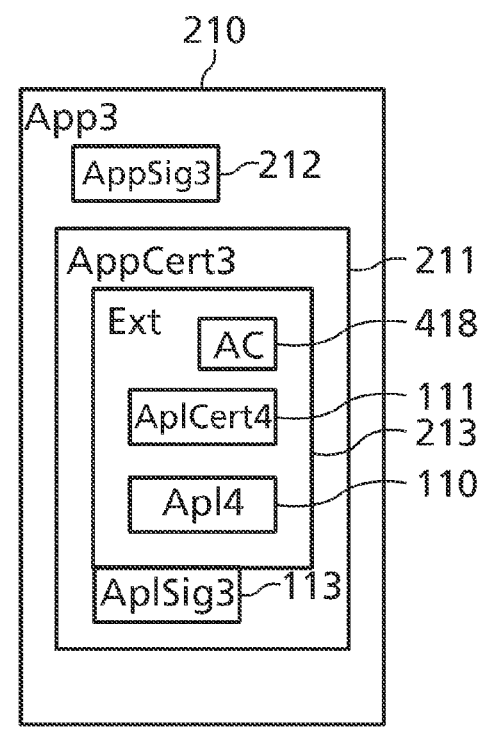

The signature 113 of the applet provider 100 is a cipher of the app certificate 211 encrypted with the secret key 120 of the applet provider 100, and can be present separately in the installation package of the app 210 (cf. FIG. 4). The signature 113 can be brought into the signature field for example according to the X.509 standard. The app certificate 211 can take up in the extension fields 213 (further) information items of the applet provider 100 that relate to the applet 110, for example the applet certificate 111 with the public key 121 of the applet provider 100 or (not shown in FIG. 4a; cf. FIG. 4b and text below) the byte code of the total applet 110. Likewise, the unique app ID 417 can also be present as an extension 213 in the app certificate 211, besides the access rights AC 418.

The thus equipped app 210 is then offered by the applet provider 100 in the step S4 ("deploy App3") at a public app market, for example at so-called "Google Market Place", to potential users for installation on their smartphones. From there the app 210 is downloaded in the step S5 ("install App3") and installed in the smartphone 300 under the Android operating system 310.

Because the app 210 offered at the "Market Place" or another public platform carries the signature 113 of the applet provider 100, which is formed over the total app certificate 211 together with the access rights 418, the signature 113 represents an authorization of the access of the app 210 to the applet 110 through the applet provider 100.

In the step S5 the app 210 is installed under the Android operating system 310 by means of a special installation routine 320 ("package installer"), by the installation routine 320 first checking the signature 212 of the app provider 200. For this purpose, the signature 212 is decrypted with the public key 221 of the app provider 200 and compared with the signed plain text of the app 210. The installation routine 320 obtains the public key 221 from the app certificate 211 attached to the app 210, which certificate guarantees the trustworthiness of the public key 221.

In the step S6 ("start App3") the installed app 210 is started by a user of the smartphone 300, and said app then attempts to access the applet Apl4 110 in a step S7 ("access Apl4"). However, the app App3 210 at first does not yet have access rights 418 for this purpose in the access rights list 416 of the security applet 410. The required access rights 418 are hitherto present only in the app certificate 211.

Subsequently, in the step S8 ("verify AppCert3") the app certificate 211 is verified by the API 330, by the signature 113 being decrypted with the public key 121 of the applet provider 100 and compared with the plain text of the app certificate 211. Departing therefrom, the verification of the app certificate 211 and the subsequent updating of the access rights list 416 can also be effected directly after or even upon the installation of the app 210 in step S5. The verification of the step S8 can, in a preferred embodiment variant, also be performed by the security applet 410 in the secure environment of the SD card 400. In this case the app certificate 211 is passed through from the programming interface 330 to the security applet 410.

Upon the verification of the signature 113 the API 330 (or the security application 410) obtains the public key 121 of the applet provider 100 from the certificate list 412, in which the applet certificate 111 was deposited upon the installation of the applet 110 in the SD card 400 carried out in step S1. If the verification of the signature 113 is successful, the updating data stated in the extension field 213 of the app certificate 211, i.e. at least the access rights 418, are extracted by the API 330 and transmitted to the security applet 410 in step S9 ("transmit UpdtDat to SecApl") for configuring the applet 110. If the verification in step S8 is carried out through the security applet 410, the latter informs the API 330 upon successful verification that the updating data 418 can be extracted from the app certificate 211. Alternatively, the security applet 410 can also extract the updating data 418 from the app certificate 211. Upon or after the extracting of the updating data 418 their integrity does not have to be checked further, however, because it was already checked through the verification of the signature 113 of the applet provider 100 in step S8.

In the step S10 ("update CL"), the security applet 410 finally configures the SD card 400 with regard to the applet 110, by the access rights list 416 being updated with the updating data in the form of the access rights 418 of the app 210 to the applet 110. For this purpose, the relevant access rights list 416 is ascertained via the applet ID 414. Thereafter the app ID 417 is created in the form of a SHA-1 hash value of the app certificate 211 and compared with the app IDs 417 already specified in the access rights list 416, or is newly entered therewith the corresponding access rights 418. Upon a later access of the app 210 to the applet 110 the security applet 410 can check any time via the applet ID 414 and the app ID 417 whether the required access rights 418 are present.

Finally, the security application 410 grants access to the applet 110 through the app 210 in step S11 ("grant access").

Hereinafter the step sequence S2 to S9, S10a to S10e and S11 will be considered in connection with FIG. 3, FIG. 4b, including the employment of the API 330 as a proxy server according to the invention. The step 10 is replaced by the step sequence 10a-10e, in accordance with the installation of a new applet 110 in the SD card 400 via the API 330 as a proxy server. According to the embodiment of the invention from FIGS. 3 and 4b, there is made available to the security applet 410 by means of the container data structure of the app certificate 211 an applet 110 hitherto not installed on the SD card 400. The updating of the SD card 400 with regard to the applet 110 comprises here the installation of the applet 110 on the SD card 400 and the setting-up of the corresponding access rights 418. Upon the installation of the applet 110 in the SD card 400, the programming interface API 330 implemented in the smartphone 300 is employed as a proxy server between the security applet 410 and a data-carrier management of the SD card 400, in order to be able to install in the SD card 400 the applet 110 extracted from the app certificate 211 and received by the security applet 410. The further flow of this embodiment results from the sequence of the steps S2 to S9, S10a to S10e and S11 of FIG. 1 through an interaction, comparable to the first embodiment, between the API 330 on the smartphone 300 and the security applet 410 on the SD card 400.

The step S1 of early installation of the applet 110 is omitted here, because it is precisely the subject matter of the invention to install updating data, here the applet 110, later. Further, in this embodiment the configuration step S10 is omitted; instead, the applet 110 is configured and installed by means of the steps S10a to S10e.

In step S2, the applet provider 100 integrates not only access rights 418 of the app 210 to the applet 110 into the app certificate 211, as described in connection with FIGS. 2 and 4a, but also the applet 110 itself, or its byte code, as well as the applet certificate 111 with the public key 121 of the applet provider 100. In step S3, the applet provider 100 signs the app certificate 211 with the total updating data with his secret key 120 and forms the signature 113. The installation package of the app 210 comprises, besides the signatures 212 and 113, an app certificate 211 according to FIG. 4b, comprising extension fields 213 according to the X.509 standard with access rights 418, the byte code of the applet 110 to be installed, and the applet certificate 111.

Thus, after the step S4 there is located at the "Market Place" or on another public download platform an app 210 which also comprises in the form of a data container an applet 110 to be installed on the SD card 400, authorized by the applet provider 100 by means of the signature 113 over the total app certificate 211.

To ensure the integrity of the updating data in the extension 213, in particular of the byte code of the applet 110, an end-to-end encryption is provided between the applet provider 100 and the SD card 400 or its security applet 410. Said encryption can be realized for example by a symmetric AES encryption, with the common secret key being available only to the applet provider 100 and the security applet 410.

The further flow of the steps S5 to S8 is then analogous to that described with reference to FIGS. 2 and 4a. The only important point here is that in the step S8 the app certificate 211 and its extensions 213 are checked, by the signature 113 being verified with the public key 121 of the applet provider 100 whose applet certificate 111 is not (yet) present in the certificate list 412, but rather in an extension field 213 of the app certificate 211. The verification step S8 is preferably carried out by the security applet 410, so that the verification can take place in the secure environment of the SD card 400.

After successful verification of the signature 113 of the applet provider 100, the API 330 in step S9 extracts the updating data (i.e. the access rights 418, the applet 110 and the applet certificate 111) from the app certificate 211 and passes them on to the security applet 410. As in the first embodiment, the updating data can also be extracted directly by the security applet 410, however.

In a manner comparable to the step S10, the access rights 418 are then, in step S10*a* ("update CL, AC"), deposited in the corresponding access rights list 416—identified by the hash value of the app certificate 211 as app ID 417. In so doing, the applet ID 414 is then also deposited in the security applet 410, and the applet certificate 111 extracted from the extension 213 of the app certificate 211, with the public key 121 of the applet provider 100, is deposited in the certificate list 412. Thus, starting out from the applet ID 414 there is created a totally new access rights list 416, in which the new access rights 418 of the app 210 to the applet 110 are deposited, addressed by the app ID 417 in the form of a hash value of the app certificate 211.

In step S10*b* ("decode Apl4 from UpdtDat") the extracted byte code of the applet 110, which is still available to the security applet 410 in the form as encrypted or encoded by the applet provider 100, is decoded and/or decrypted in the secure environment of the security applet 410. In step S10*b* all further required operations for preparing the installation of the applet 110 are also carried out.

The byte code of the applet 110 is subsequently not installed directly by the security applet 410. According to the Global Platform standard relevant in the smartphone area at least in the future (cf. www.globalplatform.org), such a direct installation is not provided. Instead, the installation of an applet 110 is to be performed via the smartphone 300 or its API 330. Thus, the API 330 acts in the remaining steps S10*c* to S10*e* as a mediator unit or proxy unit between the security applet 410 and the "card manager" 420 (SDCMngr) of the SD card 400, which constitutes the central management unit of the SD card 400 and is as such responsible for the installation of new applets 110.

To guarantee the data integrity of the byte code of the applet 110, a further encryption of the applet 110 can be carried out in step S10*b*, because the applet 110 is leaving the secure environment of the security applet 410 again and being made available to the card manager 420 via the potentially insecure API 330. Thus, there is either provided a further end-to-end encryption between the security applet 410 and the card manager 420, or the byte code of the applet 110 is not already decrypted in step S10*b* in the security applet 410, but only in the step S10*e* in the card manager 420 within the framework of the installation of the applet 110. In the latter case there is an end-to-end encryption between the applet provider 100 and the card manager 420, with the required keys being securely kept in the SD card 400, or the security applet 410, and/or in the card manager 420.

In the steps S10*c* and S10*d*, in accordance with the Global Platform standard the applet 110 is then transferred from the security applet 410 to the API 330 and passed on from the latter to the card manager 420 to be ultimately installed. The API 330 thus acts towards the card manager 420 as a host unit, which for its part receives the data to be made available, namely the applet 110, from the security applet 410 of the SD card 400.

The invention claimed is:

1. A method for updating a data carrier with regard to a data-carrier application executable in the data carrier, with the data carrier being inserted in a telecommunication end device, comprising the steps of:
   making updating data available to a security application installed in the data carrier;
   updating the data carrier according to the updating data, the updating of the data carrier comprising the steps of:
      transferring at least a part of the updating data from the security application to a programming interface installed in the telecommunication end device and adapted for communication between the telecommunication end device and the data carrier, wherein the programming interface serves as a proxy server that facilitates communication between two or more components of the same data carrier that are unable to communicate directly, including at least the security application and a data-carrier management;
      onward transferring the transferred updating data from the programming interface to the data-carrier management of the data carrier installed in the data carrier; and
      updating the data carrier according to the onward transferred updating data.

2. The method according to claim 1, wherein
   the updating data comprise the data-carrier application,
   the transferring comprises a transferring of the data-carrier application, the onward transferring comprises an onward transferring of the data-carrier application, and
   the updating of the data carrier comprises an installing of the data-carrier application in the data carrier.

3. The method according to claim 1, wherein the updating data comprises configuration data, and wherein the updating of the data carrier comprises a configuring of the data carrier of the security application by means of the configuration data.

4. The method according to claim 3, wherein
   the security application comprises a certificate list and at least one access rights list,
   wherein the certificate list comprises data-carrier application certificates of data-carrier applications installed in the data carrier, and the at least one access rights list states access rights of end-device applications installed in the telecommunication end device to data-carrier applications installed in the data carrier, and wherein
   upon the configuring of the data carrier the certificate list and the at least one access rights list are updated according to the updating data.

5. The method according to claim 4, wherein the configuration data comprise a data-carrier application certificate with a public key of a provider of the data-carrier application, and wherein the configuring of the data carrier, in particular of the security application, comprises an entering, through the security application, of the data-carrier application certificate in the certificate list.

6. The method according claim 1, wherein a signature, linked in particular with the updating data, is verified through the programming interface or through the security application before the data carrier is updated according to the updating data.

7. The method according to claim 6, wherein the signature is, or has been, created by means of a secret key of a provider of the data-carrier application.

8. The method according to claim 1, the step of making available of updating data comprising the steps of:
   integrating the updating data into an end-device application certificate of an end-device application to be installed in the end device;

loading the end-device application certificate and the end-device application into the telecommunication end device;

installing the end-device application in the telecommunication end device;

extracting the updating data from the end-device application certificate; and making available the extracted updating data, in particular through the programming interface, to the security application.

9. A data carrier, insertable or inserted into a telecommunication end device, comprising data-carrier applications installed in the data carrier, wherein a security application is installed in the data carrier and adapted to receive and transfer updating data and update the data carrier with the updating data according to the method according of claim 1.

10. A telecommunication end device into which a data carrier, is insertable or inserted, comprising end-device applications installed in the telecommunication end device, wherein by a programming interface of the data carrier, said interface being adapted to receive and onward transfer updating data according to the method according of claim 1.

* * * * *